(12) United States Patent
Cho et al.

(10) Patent No.: US 11,249,897 B2
(45) Date of Patent: Feb. 15, 2022

(54) DATA STORAGE DEVICE AND OPERATING METHOD THEREOF

(71) Applicant: SK hynix Inc., Gyeonggi-do (KR)

(72) Inventors: Young Ick Cho, Seoul (KR); Sung Kwan Hong, Seoul (KR); Byeong Gyu Park, Seongnam-si (KR); Sung Hun Jeon, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/821,789

(22) Filed: Mar. 17, 2020

(65) Prior Publication Data

US 2021/0064521 A1 Mar. 4, 2021

(30) Foreign Application Priority Data

Aug. 28, 2019 (KR) ........................ 10-2019-0105675

(51) Int. Cl.
| | |
|---|---|
| *G06F 12/00* | (2006.01) |
| *G06F 12/02* | (2006.01) |
| *G06F 12/0873* | (2016.01) |
| *G06F 12/0804* | (2016.01) |
| *G06F 12/0871* | (2016.01) |

(52) U.S. Cl.
CPC ...... *G06F 12/0246* (2013.01); *G06F 12/0804* (2013.01); *G06F 12/0871* (2013.01); *G06F 12/0873* (2013.01); *G06F 2212/7201* (2013.01); *G06F 2212/7209* (2013.01)

(58) Field of Classification Search
CPC ............ G06F 12/0246; G06F 12/0804; G06F 12/0871; G06F 12/0873; G06F 2212/7201; G06F 2212/7209
See application file for complete search history.

(56) References Cited

U.S. PATENT DOCUMENTS

| | | | | |
|---|---|---|---|---|
| 7,028,156 | B1 * | 4/2006 | Kiselev | ............... G06F 11/1435 711/161 |
| 2006/0161728 | A1 * | 7/2006 | Bennett | ............... G11C 16/349 711/103 |
| 2006/0184718 | A1 * | 8/2006 | Sinclair | ................. G06F 3/0652 711/103 |
| 2006/0184719 | A1 * | 8/2006 | Sinclair | ............... G06F 12/0246 711/103 |
| 2006/0184720 | A1 * | 8/2006 | Sinclair | ............... G06F 12/0246 711/103 |
| 2007/0150693 | A1 * | 6/2007 | Kaneko | ............... G06F 12/0246 711/202 |

(Continued)

FOREIGN PATENT DOCUMENTS

KR 101157763 B1 6/2012

*Primary Examiner* — Prasith Thammavong
(74) *Attorney, Agent, or Firm* — Perkins Coie LLP

(57) ABSTRACT

A data storage device includes a memory array including a plurality of memory cells; and a controller in communication with the memory array and configured to: store, in a map update buffer, one or more map segments including one or more logical address to be unmapped; determine, among logical address to physical address (L2P) entries of the one or more map segments stored in the map update buffer, L2P entries having the same memory block number; and selectively perform a first unmap operation or a second unmap operation according to whether all the L2P entries stored in the map update buffer have the same memory block number.

17 Claims, 10 Drawing Sheets

(56) References Cited

U.S. PATENT DOCUMENTS

| | | | |
|---|---|---|---|
| 2008/0034174 A1* | 2/2008 | Traister | G06F 12/0246 711/159 |
| 2008/0034175 A1* | 2/2008 | Traister | G06F 12/0246 711/159 |
| 2008/0294813 A1* | 11/2008 | Gorobets | G06F 12/0246 710/62 |
| 2008/0294814 A1* | 11/2008 | Gorobets | G11C 16/349 710/62 |
| 2010/0169551 A1* | 7/2010 | Yano | G06F 12/0246 711/103 |
| 2011/0238899 A1* | 9/2011 | Yano | G06F 12/0246 711/103 |
| 2014/0025864 A1* | 1/2014 | Zhang | G06F 12/0802 711/103 |
| 2017/0160989 A1* | 6/2017 | Hsieh | G06F 3/0659 |
| 2018/0285282 A1* | 10/2018 | Jakowski | G06F 12/0246 |
| 2019/0121743 A1* | 4/2019 | Park | G06F 12/0246 |
| 2020/0218470 A1* | 7/2020 | Cho | G06F 3/0659 |

\* cited by examiner

| Map Segment | Logical Address | Physical Address | |
|---|---|---|---|
| 0 | LBA0 | PBA0 | ← L2P Entry |
| | LBA1 | PBA1 | |
| | ⋮ | ⋮ | |
| | LBA99 | PBA99 | |
| ⋮ | ⋮ | ⋮ | |
| 99 | LBA9900 | PBA9900 | |
| | LBA9901 | PBA9901 | |
| | ⋮ | ⋮ | |
| | LBA9999 | PBA9999 | |

DATA STORAGE DEVICE AND OPERATING METHOD THEREOF

CROSS-REFERENCES TO RELATED APPLICATION

This patent document claims the priority and benefits of Korean application number 10-2019-0105675, filed on Aug. 28, 2019, which is incorporated herein by reference in its entirety.

TECHNICAL FIELD

The technology and implementations disclosed in this patent document generally relate to an electronic device, and more particularly, to a data storage device and an operating method thereof.

BACKGROUND

The computer environment paradigm has shifted to cloud computing and is progressing toward ubiquitous computing which computing is made to appear anytime and everywhere. In contrast to desktop computing, ubiquitous computing can occur in any location using any device including portable electronic devices such as cellular phones, digital cameras, and notebook computers. Such portable electronic devices generally use a data storage device including data storage media such as semiconductor memory cells to store data used in the portable electronic devices.

Data storage devices using the semiconductor memory cells as data storage media are advantageous over the traditional hard disk drives in terms of stability and durability since the semiconductor memory cells have no moving parts that are subject to mechanical failure and high power consumption. Data storage devices having such advantages include a universal serial bus (USB) memory apparatus, a memory card having various interfaces, a universal flash storage (UFS) device, and a solid state drive (SSD).

SUMMARY

The technology disclosed in this patent document can be implemented in various embodiments to provide a data storage device that can perform an unmap operation effectively In some embodiments of the disclosed technology, a data storage device includes a memory array including a plurality of memory cells; and a controller in communication with the memory array and configured to: store, in a map update buffer, one or more map segments including one or more logical address to be unmapped; determine, among logical address to physical address (L2P) entries of the one or more map segments stored in the map update buffer, L2P entries having the same memory block number; and selectively perform a first unmap operation or a second unmap operation according to whether all the L2P entries stored in the map update buffer have the same memory block number.

In some embodiments of the disclosed technology, an operating method of a data storage device includes: storing, in a map update buffer, one or more map segments including one or more logical addresses to be unmapped; determining, among logical address to physical address (L2P) entries of the one or more map segments stored in the map update buffer, L2P entries having the same memory block number; and selectively performing a first unmap operation or a second unmap operation according to whether all the L2P entries stored in the map update buffer have the same memory block number.

In some embodiments of the disclosed technology, an optimized unmap operation is selectively performed for each of a case where physical addresses mapped to logical addresses requested to be unmapped are included in one memory block and a case where the physical addresses are included in a plurality of memory blocks, so that it is possible to shorten time required for the unmap operation.

In some embodiments of the disclosed technology, a data storage device includes a memory array including a plurality of memory cells, and a controller in communication with the memory array and configured to store, in a map update buffer, one or more logical addresses corresponding to one or more logical address to physical address (L2P) entries of map segments to be unmapped, determine, among the one or more logical addresses stored in the map update butter, logical addresses having the same memory block number, and selectively perform a first unmap operation or a second unmap operation according to whether all the logical addresses stored in the map update buffer have the same memory block number.

In some embodiments of the disclosed technology, an operating method of a data storage device, including a memory array and a controller, includes storing, in a map update buffer, one or more logical addresses corresponding to one or more logical address to physical address (L2P) entries of map segments to be unmapped, determining, among the one or more logical addresses stored in the map update butter, logical addresses having the same memory block number, and selectively performing a first unmap operation or a second unmap operation according to whether all the first logical addresses stored in the map update buffer have the same memory block number.

In some embodiments of the disclosed technology, a data storage device includes a data storage device includes a nonvolatile memory and a controller. The controller stores one or more map segments to be unmapped, including first logical addresses to be trimmed, in a map update buffer, counts the number of second logical addresses having substantially the same memory block number among logical address to physical address (L2P) entries of the one or more map segments stored in the map update buffer, and selectively performs a first unmap operation or a second unmap operation according to whether the number of first logical addresses coincides with the number of second logical addresses.

In some embodiments of the disclosed technology, an operating method of a data storage device includes: a step of storing one or more map segments to be unmapped including first logical addresses to be trimmed in a map update buffer; a step of counting the number of second logical addresses having substantially the same memory block number among logical address to physical address (L2P) entries of the one or more map segments stored in the map update buffer; and a step of selectively performing a first unmap operation or a second unmap operation according to whether the number of first logical addresses coincides with the number of second logical addresses.

DETAILED DESCRIPTION

Hereinafter, preferred embodiments will be described with reference to the accompanying drawings.

Figure 1:
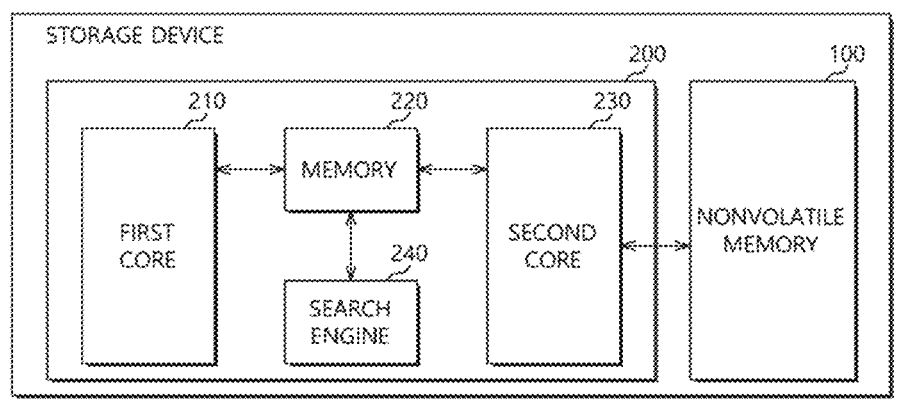
FIG. 1 is a diagram illustrating a data storage device based on an embodiment of the disclosed technology.

FIG. 1 is a diagram illustrating a configuration of a data storage device 10 based on an embodiment of the disclosed technology.

Referring to FIG. 1, the data storage device 10 based on an embodiment may be accessed by a host (not illustrated) such as a cellular phone, an MP3 player, a laptop computer, a desktop computer, a game machine, a television, and an in-vehicle infotainment system to write or read data to or from the data storage device 10. Example of the data storage device 10 may include any type of memory system that includes semiconductor memory cells to store data on a temporary or permanent basis.

The data storage device 10 may include any type of storage media that can support an interface protocol electrically or communicatively connected to the host. For example, the data storage device 10 may include a multimedia card in the form of a solid state drive (SSD), an MMC, an eMMC, an RS-MMC, or a micro-MMC, a secure digital (SD) card, a mini-SD, or a micro-SD, a universal serial bus (USB) storage device, a universal flash storage (UFS) device, a personal computer memory card international association (PCMCIA) card, a peripheral component interconnection (PCI) card, a PCI express (PCI-E) card, a compact flash (CF) card, a smart media card, and/or a memory stick.

In manufacturing the data storage device 10, various types of packing technologies may be used, including a package on package (POP), a system in package (SIP), a system on chip (SOC), a multi-chip package (MCP), a chip on board (COB), a wafer-level fabricated package (WFP), and a wafer-level stack package (WSP).

In some implementations, the data storage device 10 may include a nonvolatile memory 100 and a controller 200.

The nonvolatile memory 100 may operate as a data storage medium of the data storage device 10. The nonvolatile memory 100 may be configured as any one of various types of nonvolatile memories, such as a NAND flash memory apparatus, a NOR flash memory apparatus, a ferroelectric random access memory (FRAM) using a ferroelectric capacitor, a magnetic random access memory (MRAM) using a tunneling magneto-resistive (TMR) film, a phase change random access memory (PRAM) using chalcogenide alloys, and a resistive random access memory (ReRAM) using a transition metal oxide, according to memory cells.

Although not shown in FIG. 1, the nonvolatile memory 100 may include a plurality of memory chips (or dies). The embodiments discussed herein may also be implemented to provide the data storage device 10 including the nonvolatile memory 100 including the plurality of memory chips.

The memory cell array 110 may include a memory cell array (not illustrated) having a plurality of memory cells arranged in rows and columns. Each memory cell can be accessed using a plurality of bit lines and a plurality of word lines coupled to the plurality of memory cells. The memory cell array may include a plurality of memory blocks, each of which includes a plurality of pages.

In some implementations, each memory cell of the memory cell array may be a single level cell (SLC) for storing one bit of data per memory cell, a multi-level cell (MLC) for storing two bits of data per memory cell, a triple level cell (TLC) for storing three bits of data per memory cell, or a quad level cell (QLC) for storing four bits of data per memory cell. The memory cell array may include at least one of the single level cell, the multi-level cell, the triple level cell, or the quad level cell. For example, the memory cell array may be fabricated in a two-dimensional horizontal structure or a three-dimensional vertical structure.

The controller 200 may control the overall operations of the data storage device 10. The controller 200 may process requests received from the host. The controller 200 may generate control signals for controlling the operation of the nonvolatile memory 100 in response to the requests received from the host, and provide the generated control signals to the nonvolatile memory 100. In some implementations, the controller 200 may include a first core 210, a memory 220, and a second core 230. The controller 200 may further include a search engine 240.

The first core 210 may serve as an interface between the host and the data storage device 10 based on the protocol of the host. Therefore, the first core 210 may be called a protocol core. For example, the first core 210 may communicate with the host through any one of universal serial bus (USB), universal flash storage (UFS), multi-media card (MMC), parallel advanced technology attachment (PATA), serial advanced technology attachment (SATA), small computer system interface (SCSI), serial attached SCSI (SAS), peripheral component interconnection (PCI), and PCI express (PCI-E) protocols.

The first core 210 may include a micro control unit (MCU) and a central processing unit (CPU). The first core 210 may receive commands transmitted from the host and provide the received commands to the second core 230.

In some implementations, the first core 210 may store data ("write data") received from the host in a write buffer (see FIG. 2) of the memory 220. To this end, the controller 200 may further include a separate data transmission block (not illustrated) for transmitting the data received from the host to the write buffer of the memory 220. For example, the data transmission block may receive data from the host according to a control signal received from the first core 210, and store the received data in the write buffer of the memory 220.

In some implementations, the first core 210 may transmit data ("read data") stored in a read buffer (see FIG. 2) of the memory 220 to the host. For example, the data transmission block may read data stored in the read buffer of the memory 220 according to a control signal received from the first core 210, and transmit the read data to the host.

The first core 210 may generate a descriptor on the basis of a command received from the host, and provide the generated descriptor to the second core 230. The descriptor may indicate the task requested by the host and include information required for the second core 230 to process the command received from the host.

In some implementations, when an unmap command is received from the host, the first core 210 may queue the received unmap command to an unmap command (CMD) queue allocated in a command queue (not illustrated) of the memory 220, In one example, the unmap command may indicate a set of commands that can allow the host to inform the data storage device 10 which blocks of data are no longer considered in use and can be unallocated.

In some implementations, the memory 220 may include, but not limited to, a random access memory such as a dynamic random access memory (DRAM) or a static random access memory (SRAM). Although FIG. 1 illustrates that the memory 220 is included in the controller 200, the memory 220 may be disposed outside the controller 200.

The memory 220 may be physically and electrically connected to the first core 210 and the second core 230. The memory 220 may store firmware that is executed by the second core 230. Furthermore, the memory 220 may store data (e.g., meta data) required for executing the firmware. That is, the memory 220 may operate as a working memory of the second core 230.

Furthermore, the memory 220 may be configured to include a buffer for temporarily storing write data to be transmitted from the host to the nonvolatile memory 100, and read data to be transmitted from the nonvolatile memory 100 to the host. That is, the memory 220 may operate as a buffer memory. The internal configuration of the memory 220 will be described below in detail with reference to FIG. 2.

The second core 230 may control the overall operations of the data storage device 10 by executing firmware or software loaded on the memory 220. The second core 230 may decrypt and execute a code type instruction or algorithm such as firmware or software. Therefore, the second core 230 may also be called a flash translation layer (FTL) core. The second core 230 may include a micro control unit (MCU) and a central processing unit (CPU).

In some implementations, the FTL core may control how data is stored and retrieved to and from the data storage device 10 that includes a semiconductor memory array. Hard disk drives have been key storage devices, and thus file systems for hard disk drives are being used as general-purpose file systems. Memory systems having flash memory devices can utilize such general-purpose file systems, but they are suboptimal for several reasons, such as erasing blocks and wear leveling. For example, flash memory blocks need to be erased before they can be written to, and thus the memory systems having flash memory devices need to have information associated with erasing blocks, which hard disk drives do not need. Therefore, the FTL core may be used between the general-purpose file system and the flash memory to fill the gap between different file systems.

The second core 230 may generate control signals for controlling the operation of the nonvolatile memory 100 on the basis of a command provided from the first core 210, and provide the generated control signals to the nonvolatile memory 100. The control signals may include a command, an address, and an operation control signal for controlling the nonvolatile memory 100. The second core 230 may provide the nonvolatile memory 100 with write data temporarily stored in the memory 220, or receive read data from the nonvolatile memory 100.

The search engine 240 may search for logical addresses having the same block number among logical addresses of a map segment to be unmapped, stored in a map update buffer (see FIG. 2) of the memory 220 and count the number of such logical addresses. The logical addresses having the same block number may indicate logical addresses that are mapped to physical addresses included in one memory block. The search engine 240 may operate under the control of the second core 230. Furthermore, the search engine 240 may operate under the control of a map module (MM) (see FIG. 3) executed by the second core 230.

Figure 2:
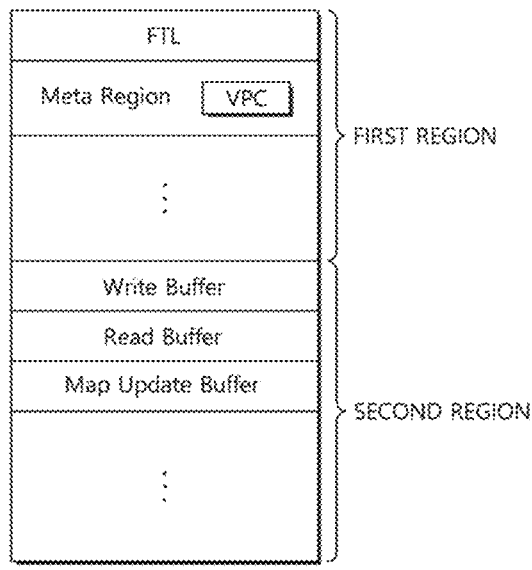
FIG. 2 is a diagram illustrating a memory of FIG. 1.
Figures 3, 4:
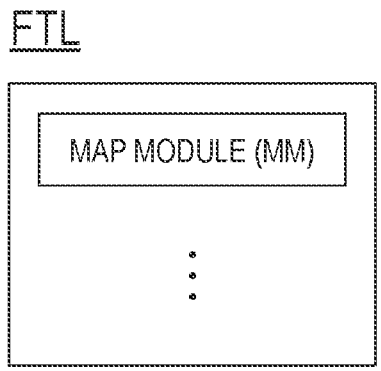
FIG. 3 is a diagram illustrating a flash translation layer (FTL) of FIG. 2.
FIG. 4 is a diagram illustrating an address mapping table based on an embodiment of the disclosed technology.

FIG. 2 is a diagram illustrating the memory 220 of FIG. 1 and FIG. 3 is a diagram illustrating the flash translation layer (FTL) of FIG. 2.

Referring to FIG. 2, the memory 220 based on some embodiments of the disclosed technology may be divided into a first region and a second region. For example, the first region of the memory 220 may store software (or firmware) interpreted and executed by the second core 230 and meta data required when the second core 230 performs computation and processing operations. Furthermore, the first region of the memory 220 may store commands received from the host.

In some implementations, software stored in the first region of the memory 220 may be the flash translation layer (FTL). Functions of the flash translation layer (FTL) may be executed by the second core 230 to control the unique operation of the nonvolatile memory 100, and provide the host with device compatibility ranging from the traditional hard disk drive to the flash memory based SSD. The flash translation layer (FTL) can enable the host to use the data storage device 10 based on the existing file system such that flash memory based data storage device can be used as a general storage device such as a hard disk.

The flash translation layer (FTL) may be stored in a system region (not illustrated) of the nonvolatile memory 100, and when the data storage device 10 is powered on, the flash translation layer (FTL) may be read from the system region of the nonvolatile memory 100 and loaded on the first region of the memory 220. Furthermore, the flash translation layer (FTL) may also be loaded on a dedicated memory (not illustrated) of the second core 230 separately provided inside or outside the second core 230.

The flash translation layer (FTL) may include modules for performing various functions. For example, referring to FIG. 3, the flash translation layer (FTL) may include, but not limited to, a map module MM, a read module, a write module, a garbage collection module, a wear-leveling module, and a bad block management module. For example, each of the modules included in the flash translation layer (FTL) may include a set of source codes for performing a specific operation (or function).

The map module MM may be configured to manage the nonvolatile memory 100 and the memory 220 to perform operations related to map data. The operations related to map data may include, but not limited to, an address mapping (translation) operation, a map update operation, and a map caching operation.

For example, when a write command, a logical address, and write data are provided from the host, the second core 230 may execute the operations of the map module MM to store the logical address in a region corresponding to a physical address in which the write data is to be stored in an address buffer (not illustrated) of the memory 220. That is, the logical address is mapped to a physical address corresponding to the actual location where data is to be stored.

Furthermore, when a condition for performing the map update operation is satisfied, the second core 230 may execute operations of the map module MM to update previous mapping information stored in an address mapping table (see FIG. 4) to the latest mapping information on the basis of mapping information between logical addresses and physical addresses stored in the address buffer or to perform a trim operation on logical addresses requested to be unmapped from the host. In some implementations, the trim operation includes notifying the memory system of which data it can skip rewriting the next time it performs a block erase. By notifying the memory system of data that is no longer considered in use, the memory system can reduce the total amount of data to be rewritten from one memory location to another memory location during, for example, a garbage collection operation.

As shown in FIG. 2, the first region of the memory 220 may include a meta region where meta data required for operating various modules included in the flash translation layer (FTL) is stored. The meta region may store a valid page count (VPC) for each of a plurality of memory blocks included in the nonvolatile memory 100. The valid page count of the memory block may be maintained by the map module MM during the execution of the map update operation.

The second region of the memory 220 may include a write buffer, a read buffer, and a map update buffer.

The write buffer may be configured to temporarily store write data to be transmitted from the host to the nonvolatile memory 100. The read buffer may be configured to temporarily store read data to be read the nonvolatile memory 100 and transmitted to the host. The map update buffer may be configured to temporarily store a map segment in which mapping information is to be updated.

In some implementations, a distance between the first region of the memory 220 and the first and second cores 210 and 230 may be shorter than that between the second region of the memory 220 and the first and second cores 210 and 230. As the first region of the memory 220 is physically close to the first and second cores 210 and 230, the first core 210 and the second core 230 may quickly access the first region of the memory 220.

The first core 210 and the second core 230 frequently access the first region of the memory 220. Each time a command is received from the host, the first core 210 accesses the first region of the memory 220 in order to queue the received command to the first region of the memory 220. Furthermore, the second core 230 accesses the first region of the memory 220 in order to dequeue a command stored in the first region of the memory 220 and process the dequeued command (or perform an operation such as a background operation unrelated to the command) and execute firmware stored in the first region of the memory 220.

As described above, since the first core 210 and the second core 230 may frequently access the first region of the memory 220, a command processing speed is increased, thereby improving overall performance of the data storage device 10.

FIG. 4 is a diagram illustrating an address mapping table.

Although not illustrated in FIG. 1, the nonvolatile memory 100 may include the address mapping table illustrated in FIG. 4.

Referring to FIG. 4, the address mapping table may include a plurality of map segments. Each map segment may include a plurality of logical address to physical address (L2P) entries. Each L2P entry may include one physical address mapped to one logical address. The logical addresses included in each map segment may be sorted and fixed in an ascending (or descending) order, A physical address mapped to each logical address may be updated to a physical address corresponding to the latest position. Furthermore, mapping between logical addresses and physical addresses may be unmapped according to an unmap request from the host.

Although FIG. 4 illustrates that the address mapping table includes 100 map segments 0 to 99 and each of the map segments 0 to 99 includes 100 L2P entries, the number of map segments and the number of L2P entries are not particularly limited thereto. Furthermore, the map update operation may be performed in units of map segments. For example, when logical addresses in which mapping information is to be updated are 'LBA1 to LBA30', all logical addresses LBA0 to LBA99 included in the map segment '0' including 'LBA1 to LBA30' are read during the map update operation and are stored in the map update buffer of the memory 220, and then mapping information of 'LBA1 to LBA30' needs to be updated. The updating of the mapping information may indicate changing physical addresses mapped to 'LBA1 to LBA30' to physical addresses corresponding to the latest position or unmapping physical addresses previously mapped to 'LBA1 to LBA30'.

Figure 5:
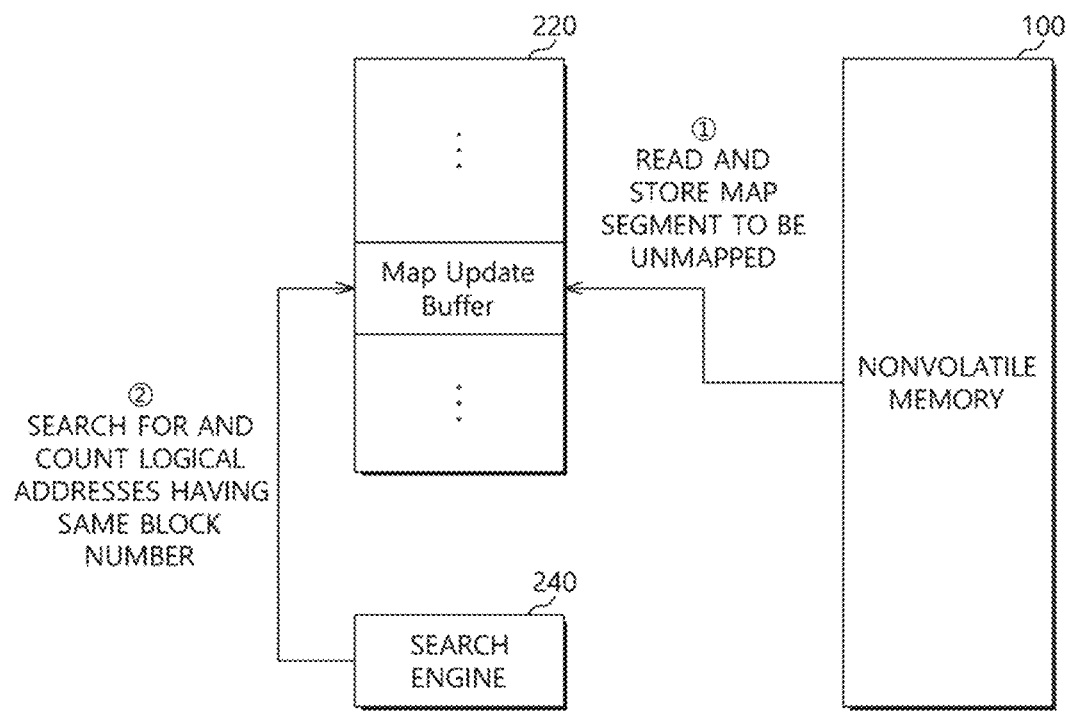
FIG. 5 is a diagram illustrating a process of searching for and counting logical addresses having the same block number in a map segment to be unmapped, based on an embodiment of the disclosed technology.

FIG. 5 is a diagram illustrating a process of searching for and counting logical addresses having the same block number in a map segment to be unmapped based on an embodiment of the disclosed technology.

As described above, when the condition for performing the map update operation is satisfied, the second core 230 may execute the operations of the map module MM to process an unmap command for a specific logical address received from the host. Unmapping of logical addresses and physical addresses according to the unmap command is also included in the map update operation. By way of example and not by limitation, only unmapping of logical addresses and physical addresses according to the unmap command during the map update operation will be described.

Referring to FIG. 5, the map module MM executed by the second core 230 may provide the nonvolatile memory 100 with a command for reading a map segment to be unmapped, on the basis of the unmap command received from the host and logical addresses to be unmapped (hereinafter, referred to as 'first logical addresses'). The nonvolatile memory 100 may read the map segment to be unmapped on the basis of the command provided from the map module MM, and transmit the read map segment to be unmapped to the controller 200 (see FIG. 1). The map module MM may store the map segment to be unmapped, received from the nonvolatile memory 100, in the map update buffer of the memory 220 (①).

Then, the map module MM may search for and count one or more logical addresses (hereinafter, referred to as 'second logical addresses'), which have the same block number among logical addresses included in the map segment to be unmapped stored in the map update buffer, by using the search engine 240 (②). For example, the map module MM may provide the search engine 240 with information such as a search start position, a search range, and a search condition, and the search engine 240 may extract data corresponding to the search condition while scanning data from the search start position to the search end position in the map update buffer of the memory 220 according to the information provided from the map module MM, and count the number of extracted data. Such a search method is discussed by way of example and a method of searching for and counting the second logical addresses among logical addresses stored in the map update buffer is not particularly limited thereto.

Then, although not illustrated in FIG. 5, the map module MM may determine whether the number of first logical addresses, which are logical addresses to be unmapped, coincides with the number of second logical addresses acquired using the search engine 240, and manage the valid page count of a memory block in another method according to a result of the determination.

In one example, the map module MM may determine whether all the logical addresses stored in the map update buffer have the same memory block number.

When the number of first logical addresses coincides with the number of second logical addresses, the map module MM may subtract the number of the logical addresses having the same memory block number from the valid page count of a memory block corresponding to a corresponding block number. Then, the map module MM may sequentially trim the mapping information of the first logical addresses.

In one example, when all the logical addresses stored in the map update buffer have the same memory block number, the map module MM may subtract the number of the logical addresses having the same memory block number from the valid page count.

On the other hand, when the number of first logical addresses does not coincide with the number of second logical addresses, the map module MM may repeatedly perform an operation of reducing the valid page count of the corresponding memory block and an operation of performing trim processing by the number of first logical addresses, with respect to each of the first logical addresses.

In one example, when at least one of the logical addresses stored in the map update buffer has a different memory block number, the map module MM subtracting one at a time from the valid page count for a corresponding memory block.

That is, depending on a case (for example, a sequential case) where physical addresses mapped to logical addresses to be unmapped are included in one memory block and a case (for example, a random case) where the physical addresses are included in a plurality of memory blocks, the map module MM may manage the valid page count of the memory block in a manner appropriate for each case. Accordingly, it is possible to effectively perform an unmap operation, that is, an operation of updating the valid page count of a memory block corresponding to physical addresses unmapped from logical addresses and an operation of trimming the mapping information of the logical addresses.

Figure 6:
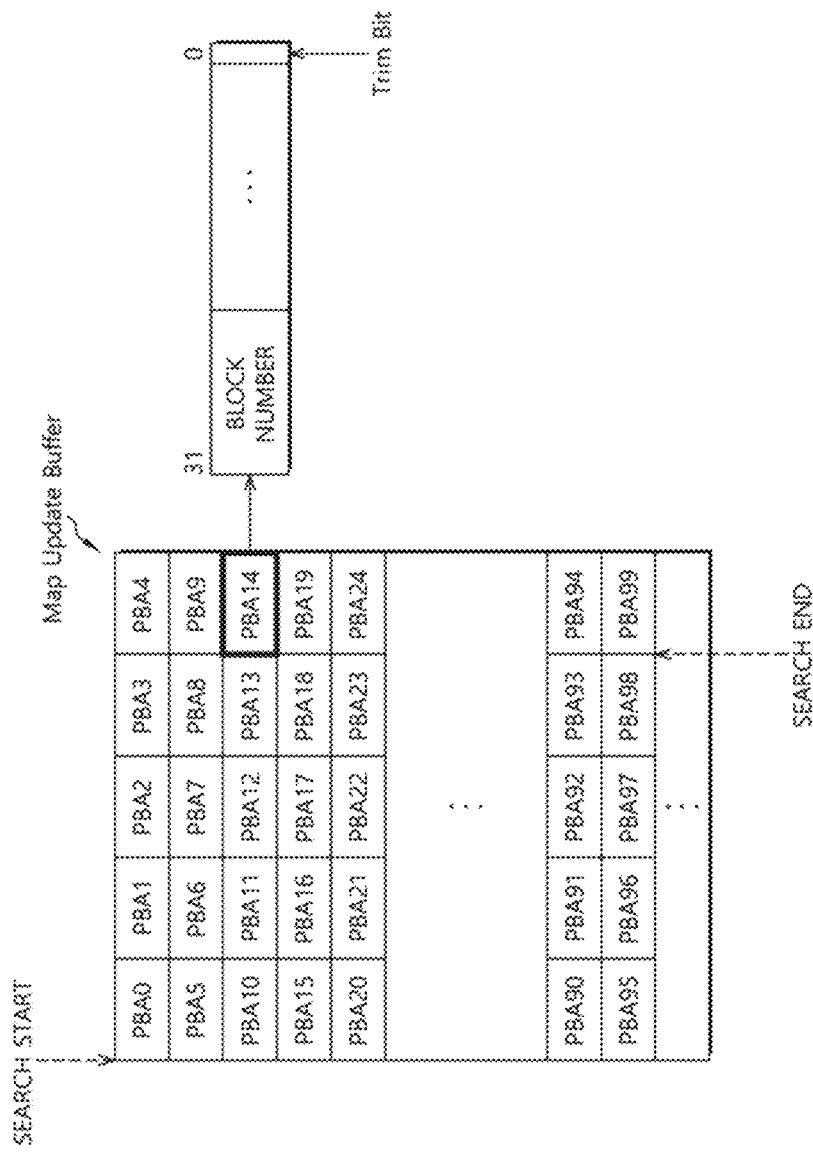
FIG. 6 is a diagram illustrating how a search engine based on an embodiment of the disclosed technology can distinguish logical addresses having the same block number.

FIG. 6 is a diagram illustrating how the search engine based on an embodiment of the disclosed technology can distinguish logical addresses having the same block number.

As illustrated in FIG. 6, each of physical addresses PBAx may be composed of 32 bits (4 bytes), and some upper bits including the most significant bit may indicate a block number. The block number may be called a block index. The search engine 240 may sequentially scan physical addresses from a position (or a region) marked as the start of search to a position (or a region) marked as the end of the search, but may scan only upper bits of each of the physical addresses, that is, bits indicating the block number. The range from the position marked as the start of the search to the position marked as the end of the search, that is, the search range may be included in the information provided from the map module MM.

The search engine 240 may count physical addresses having the same block number on the basis of a result of the scanning. The number of counted physical addresses may correspond to the number of second logical addresses described above. The map module MM may compare the number of physical addresses counted by the search engine 240, that is, the number of second logical addresses and the number of first logical addresses to be unmapped, and determine whether the number of second logical addresses coincides with the number of first logical addresses to be unmapped. The map module MM may perform an unmap operation in a method appropriate for each case on the basis of a result of the determination.

As described above, the unmap operation may include an operation of updating the valid page count of memory blocks corresponding to physical addresses mapped to the first logical addresses to be unmapped and an operation of trimming mapping information on the second logical addresses. The trimming operation may be performed by changing a trim bit among bits constituting the physical addresses illustrated in FIG. 6 to a value representing an unmap state (or an unmapped state). Although FIG. 6 illustrates that the trim bit is the least significant bit, the position of the trim bit is not particularly limited thereto.

Figure 7:
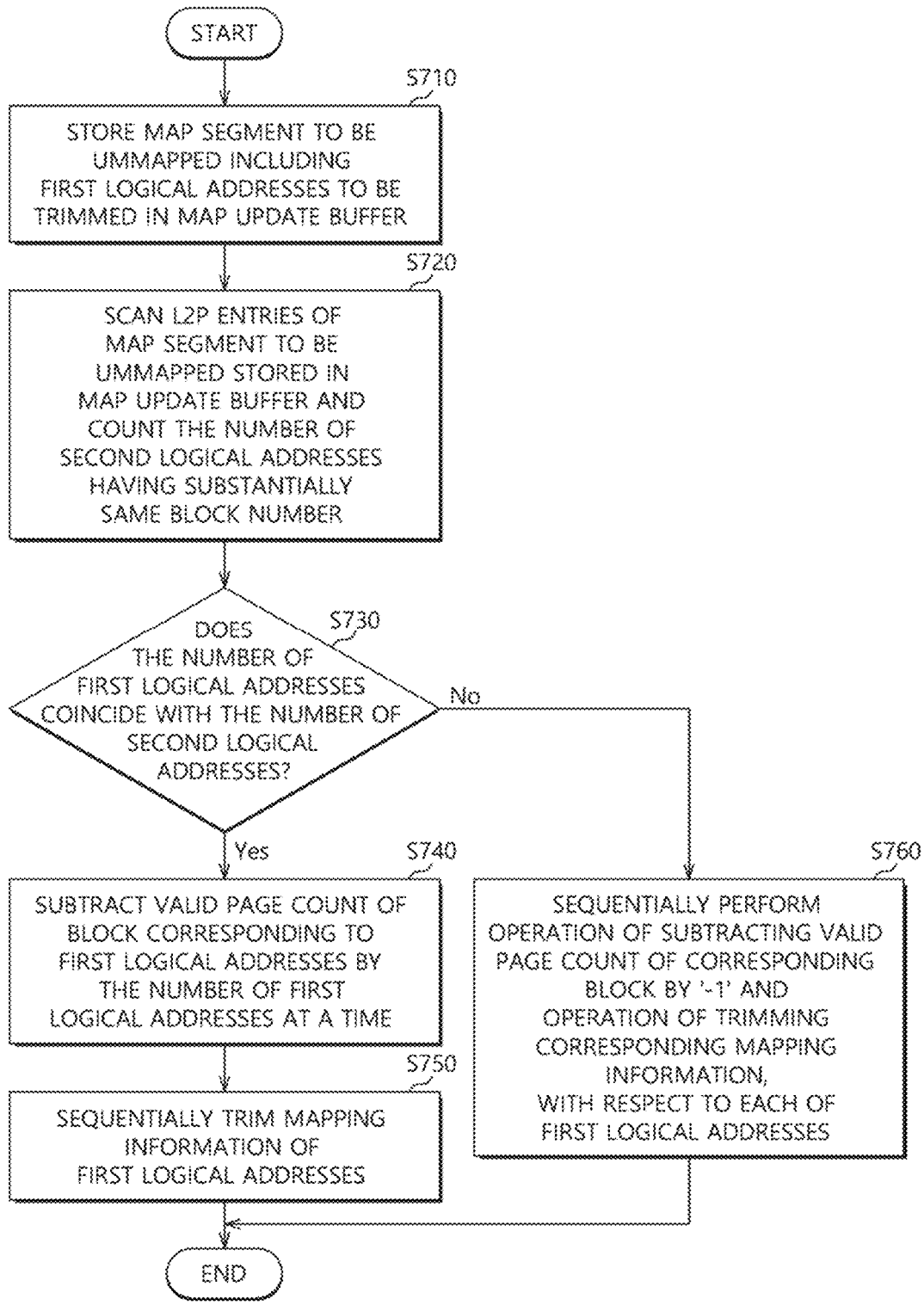
FIG. 7 is a diagram illustrating an operating method of a data storage device based on an embodiment of the disclosed technology.

FIG. 7 is a flowchart illustrating an operating method of the data storage device based on some embodiments of the disclosed technology. In describing the operating method of the data storage device based on some embodiments of the disclosed technology with reference to FIG. 7, at least one drawing of FIG. 1 to FIG. 6 may be referred.

In step S710, a map segment to be ummapped including the first logical addresses to be trimmed may be read from the nonvolatile memory 100 and stored in the map update buffer of the memory 220. Step S710 may be performed after the map update operation is triggered. A condition under which the map update operation is triggered may include various conditions already publicly known in the related art. For example, step S710 may be performed by the map module MM executed by the second core 230 of the controller 200. The map segment to be ummapped read from the nonvolatile memory 100 and stored in the map update buffer of the memory 220 may include one or more map segments. Furthermore, the map segment to be ummapped may include a plurality of L2P entries. The L2P entry may be information including logical addresses and physical addresses mapped to the logical addresses.

In step S720, the L2P entries of the map segment to be ummapped, stored in the map update buffer, may be scanned and the second logical addresses having the same block number may be searched and counted. Step S720 may be performed by the map module MM using the search engine 240. The search and counting of the second logical addresses having the same block number by the search engine 240 have been described above in detail.

In step S730, the map module MM may compare the number of first logical addresses to be trimmed and the number of second logical addresses acquired using the search engine 240, and determine whether the number of first logical addresses coincides with the number of second logical addresses. When the number of first logical addresses coincides with the number of second logical addresses, the process may proceed to step S740. When the number of first logical addresses does not coincide with the number of second logical addresses, the process may proceed to step S760.

In step S740, the map module MM may subtract the number of first logical addresses at a time from the valid page count of a block (or a memory block) corresponding to the first logical addresses. The block corresponding to the first logical addresses may be a block having physical addresses mapped to the first logical addresses.

In step S750, the map module MM may sequentially trim the mapping information of the first logical addresses. The trimming processing may be performed by changing a trim bit, among bits constituting the physical addresses mapped to the first logical addresses, to a value representing an unmapped state.

In step S760, the map module MM may sequentially perform an operation of subtracting one at a time from the valid page count of the corresponding block (or memory block) and an operation of trimming the corresponding mapping information, with respect to each of the first logical addresses.

Figure 8:
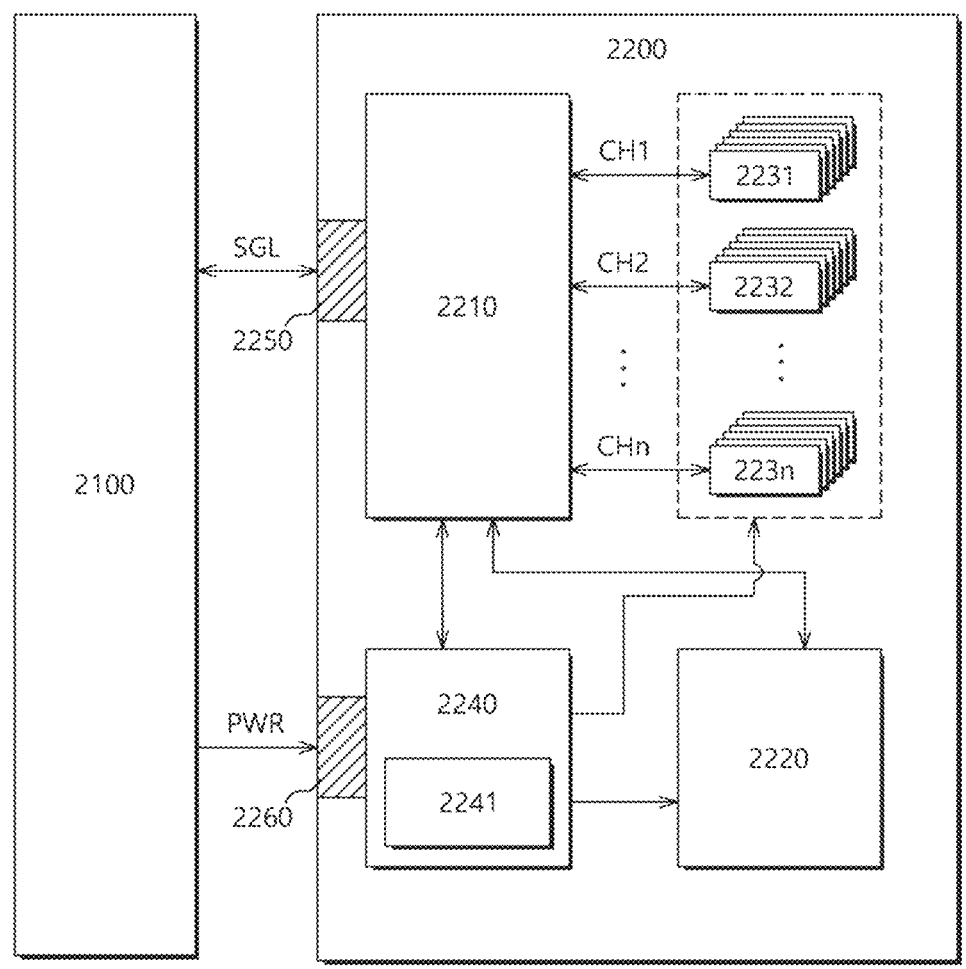
FIG. 8 is a diagram illustrating a data processing system including a solid state drive (SSD) based on an embodiment of the disclosed technology.

FIG. 8 illustrates a data processing system including a solid state drive (SSD) based on an embodiment of the disclosed technology. Referring to FIG. 8, a data processing system 2000 may include a host apparatus 2100 and a SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a data storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 9:
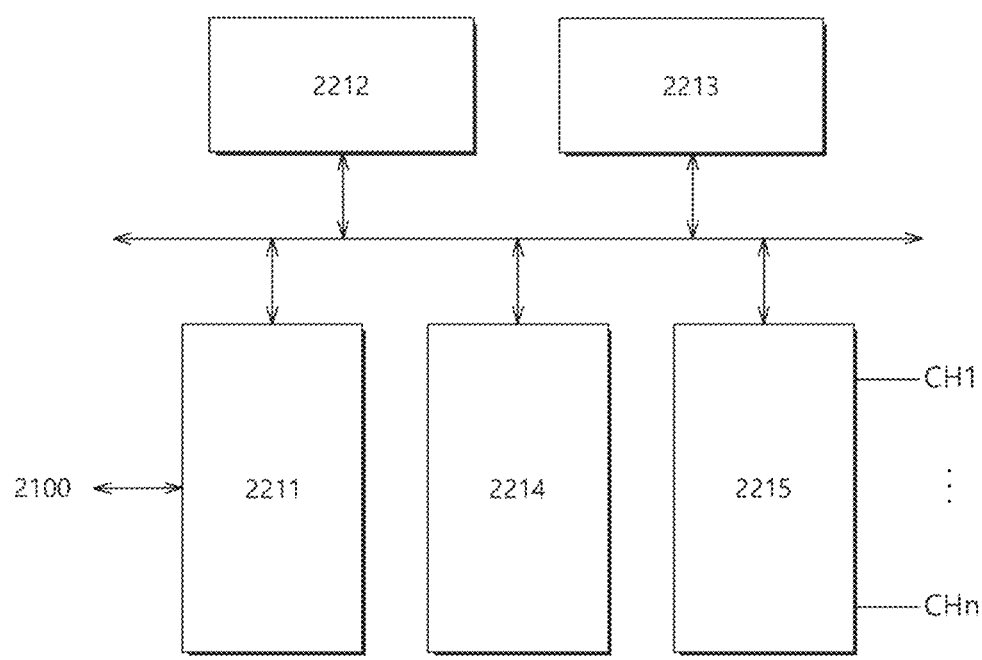
FIG. 9 is a diagram illustrating a controller illustrated in FIG. 8.

FIG. 9 illustrates the controller 2210 of FIG. 8, Referring to FIG. 9, the controller 2210 may include a host interface unit 2211, a control unit 2212, a random access memory (RAM) 2213, an error correction code (ECC) unit 2214, and a memory interface unit 2215.

The host interface unit 2211 may perform interfacing between the host apparatus 2100 and the SSD 2200 according to a protocol of the host apparatus 2100. For example, the host interface unit 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATH) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function that the host apparatus 2100 recognizes the SSD 2200 as a general-purpose data storage apparatus, for example, a hard disc drive HDD.

The control unit 2212 may analyze and process the signal SGL input from the host apparatus 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 10:
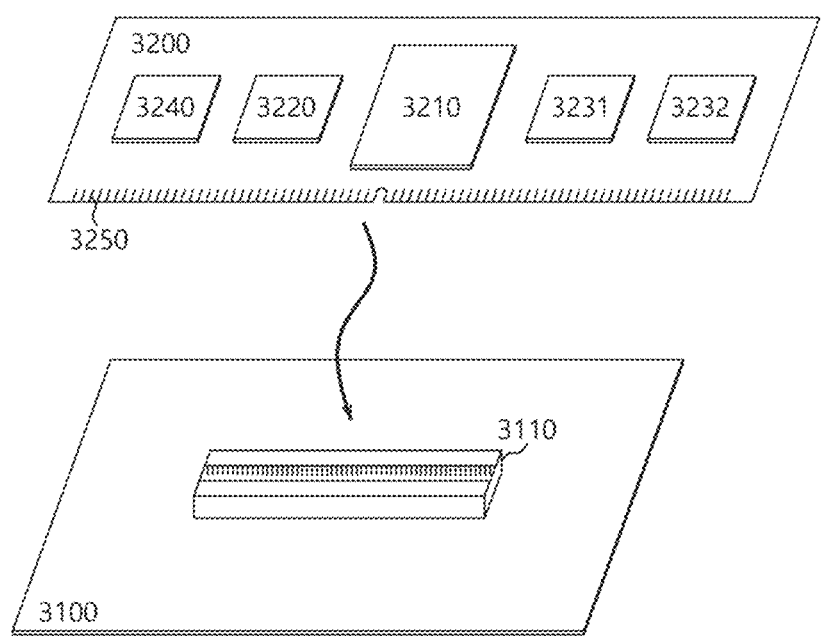
FIG. 10 is a diagram illustrating a data processing system including a data storage apparatus based on an embodiment of the disclosed technology.

FIG. 10 illustrates a data processing system including a data storage apparatus based on an embodiment of the disclosed technology, Referring to FIG. 10, a data processing system 3000 may include a host apparatus 3100 and a data storage apparatus 3200.

The host apparatus 3100 may be configured in a board form such as a printed circuit board (PCB). Although not shown in FIG. 10, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage apparatus 3200. The controller 3210 may be configured to have the same configuration as the controller 2210 illustrated in FIG. 9.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a data storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 11:
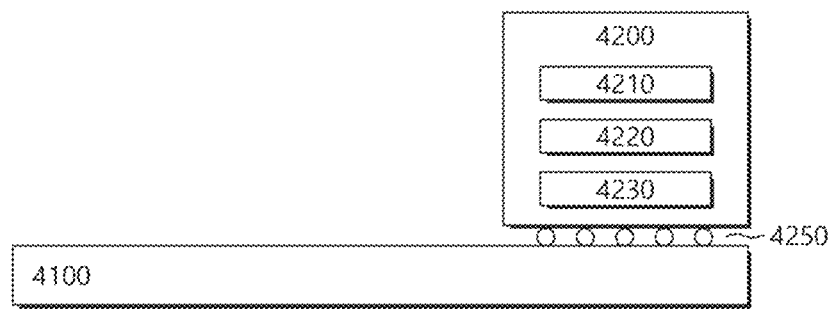
FIG. 11 is a diagram illustrating a data processing system including a data storage apparatus based on an embodiment of the disclosed technology.

FIG. 11 illustrates a data processing system including a data storage apparatus based on an embodiment of the disclosed technology. Referring to FIG. 11, a data processing system 4000 may include a host apparatus 4100 and a data storage apparatus 4200.

The host apparatus 4100 may be configured in a board form such as a PCB. Although not shown in FIG. 11, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 illustrated in FIG. 9.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 12:
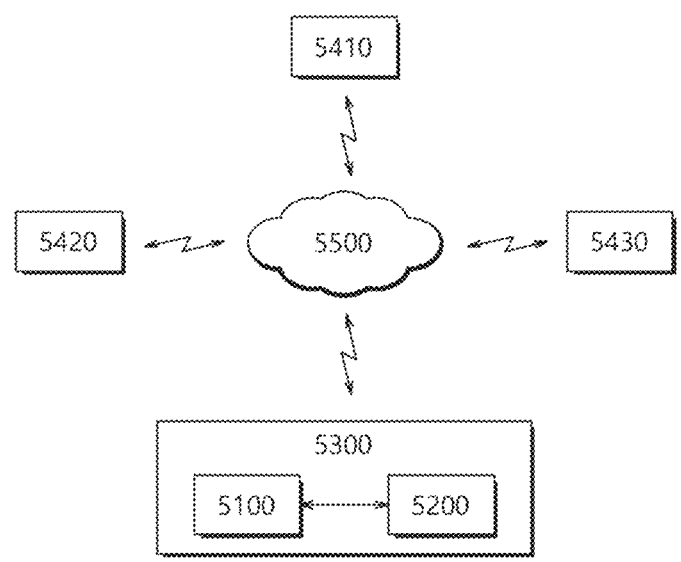
FIG. 12 is a diagram illustrating a network system including a data storage apparatus based on an embodiment of the disclosed technology.

FIG. 12 illustrates a network system 5000 including a data storage apparatus based on an embodiment of the disclosed technology. Referring to FIG. 12, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the data storage device 10 of FIG. 1, the SSD 2200 of FIG. 8, the data storage apparatus 3200 of FIG. 10, or the data storage apparatus 4200 of FIG. 11.

Figure 13:
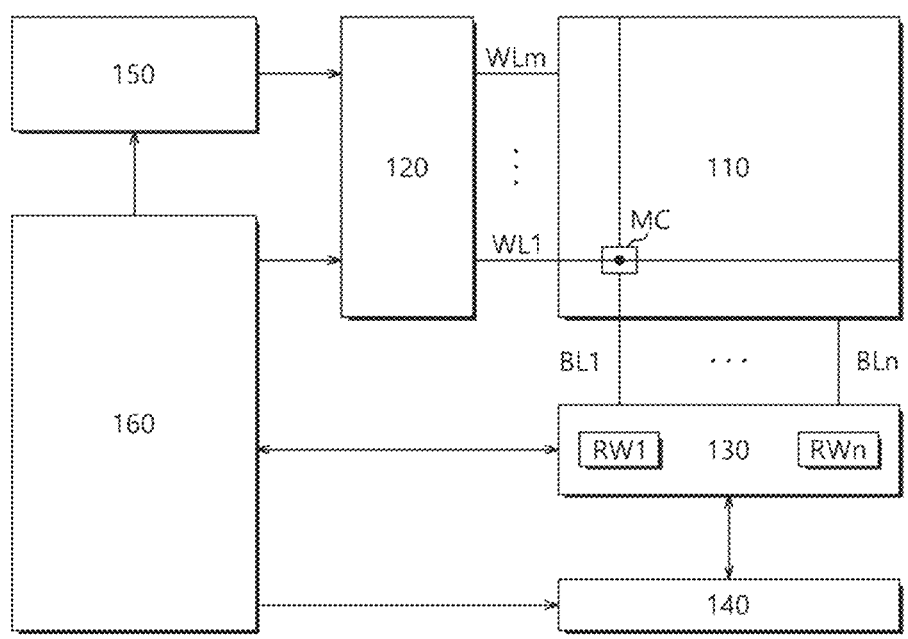
FIG. 13 is a diagram illustrating a nonvolatile memory device included in a data storage apparatus based on an embodiment of the disclosed technology.

FIG. 13 illustrates a nonvolatile memory device included in a data storage apparatus based on an embodiment of the disclosed technology. Referring to FIG. 13, a nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

While various embodiments have been described above, it will be understood to those skilled in the art that the embodiments described are examples only. Accordingly, the data storage device and the operating method thereof described herein should not be limited based on the described embodiments.

What is claimed is:

1. A data storage device including:
a memory array including a plurality of memory cells; and
a controller in communication with the memory array and configured to:
store, in a map update buffer, one or more map segments including one or more logical addresses to be unmapped;
determine, among logical address to physical address (L2P) entries of the one or more map segments stored in the map update buffer, L2P entries having the same memory block number; and
selectively perform a first unmap operation or a second unmap operation for unmapping of logical addresses from physical addresses according to whether all the L2P entries stored in the map update buffer have the same memory block number, wherein the first unmap operation and the second unmap operation include changing a bit in each physical address corresponding to the one or more logical addresses to be unmapped, to a value that represents an unmapped state.

2. The data storage device according to claim 1, wherein, upon a determination that all the L2P entries stored in the map update buffer have the same memory block number, the controller performs the first unmap operation on the one or more logical addresses to be unmapped.

3. The data storage device according to claim 2, wherein the first unmap operation comprises:
subtracting the number of the L2P entries at a time from a valid page count for a memory block corresponding to the L2P entries stored in the map update buffer; and
sequentially trimming mapping information of the logical addresses of the L2P entries stored in the map update buffer.

4. The data storage device according to claim 1, wherein, upon a determination that at least one of the L2P entries stored in the map update buffer has a different memory block number, the controller performs the second unmap operation on the one or more logical addresses to be unmapped.

5. The data storage device according to claim 4, wherein the second unmap operation includes sequentially performing an operation of subtracting one at a time from a valid page count for a corresponding memory block and trimming corresponding mapping information, with respect to each of the one or more logical addresses to be unmapped.

6. The data storage device according to claim 1, wherein the controller comprises:
a first core configured to interface with the host;
a second core configured to control an operation of the memory array; and
a search engine configured to search for the L2P entries having the same memory block number among the logical address to physical address (L2P) entries of the one or more map segments.

7. The data storage device according to claim 6, wherein the controller further comprises:

a memory configured to store a map module including source codes for trimming mapping information of the one or more logical addresses to be unmapped.

8. The data storage device according to claim 7, wherein the map module is configured to:
compare the number of the L2P entries having the same memory block number acquired using the search engine and the number of the L2P entries stored in the map update buffer;
determine whether all the L2P entries stored in the map update buffer have the same memory block number; and
perform the first unmap operation or the second unmap operation according to a result of the determination.

9. The data storage device according to claim 6, wherein the search engine is configured to scan one or more bits of each of physical addresses included in the L2P entries and count L2P entries having the same memory block number.

10. The data storage device according to claim 9, wherein the one or more bits include the most significant bit of each of the physical addresses.

11. An operating method of a data storage device including a memory array and a controller, comprising:
storing, in a map update buffer, one or more map segments including one or more logical addresses to be unmapped;
determining, among logical address to physical address (L2P) entries of the one or more map segments stored in the map update buffer, L2P entries having the same memory block number; and
selectively performing a first unmap operation or a second unmap operation for unmapping of logical addresses from physical addresses according to whether all the L2P entries stored in the map update buffer have the same memory block number, wherein the first unmap operation and the second unmap operation include changing a bit in each physical address corresponding to the one or more logical addresses to be unmapped, to a value that represents an unmapped state.

12. The operating method according to claim 11, wherein the determining of the L2P entries having the same memory block number comprises:
scanning one or more bits of each of physical addresses included in the L2P entries; and
counting the number of L2P entries having the same memory block number based on a result of the scanning.

13. The operating method according to claim 12, wherein the one or more bits include the most significant bit of each of the physical addresses.

14. The operating method according to claim 11, wherein selectively performing the first unmap operation or the second unmap operation includes performing the first unmap operation on the one or more logical addresses to be unmapped, upon a determination that all the L2P entries stored in the map update buffer have the same memory block number.

15. The operating method according to claim 11, wherein selectively performing the first unmap operation or the second unmap operation includes performing the second unmap operation on the one or more logical addresses to be unmapped upon a determination that at least one of the L2P entries stored in the map update buffer has a different memory block number.

16. The operating method according to claim 11, wherein the first unmap operation comprises:

subtracting the number of the L2P entries having the same memory block number at a time from a valid page count for a memory block corresponding to the one or more logical addresses to be unmapped; and sequentially trimming mapping information of the one or more logical addresses to be unmapped.

17. The operating method according to claim 11, wherein the second unmap operation includes sequentially performing an operation of subtracting one at a time from a valid page count for a corresponding memory block and an operation of trimming corresponding mapping information, with respect to each of the one or more logical addresses to be unmapped.

* * * * *